(12) United States Patent
Mimura et al.

(10) Patent No.: US 7,366,235 B2
(45) Date of Patent: Apr. 29, 2008

(54) UWB DEMODULATING APPARATUS

(75) Inventors: Masahiro Mimura, Suginami-ku (JP);
Kazuaki Takahashi, Machida (JP);
Suguru Fujita, Ota-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 691 days.

(21) Appl. No.: 10/855,691

(22) Filed: May 27, 2004

(65) Prior Publication Data

US 2004/0240523 A1 Dec. 2, 2004

(51) Int. Cl.
*H03K 9/04* (2006.01)
(52) U.S. Cl. ...................... 375/239; 370/213
(58) Field of Classification Search ............ 375/130, 375/142, 147, 260, 354, 150; 370/213
See application file for complete search history.

(56) References Cited

U.S. PATENT DOCUMENTS

2001/0053175 A1* 12/2001 Hoctor et al. ............. 375/130

2003/0198308 A1* 10/2003 Hoctor et al. ............. 375/354
2004/0202230 A1* 10/2004 Dowla et al. ............. 375/147

OTHER PUBLICATIONS

Ryuji Kohno, "How to Realize a High-Speed Transmission in Ultra Wideband", Nikkei Electronics, No. 829, p. 137-144, Aug. 26, 2002.

* cited by examiner

*Primary Examiner*—Khanh C. Tran
(74) *Attorney, Agent, or Firm*—RatnerPrestia

(57) ABSTRACT

A demodulated signal is to be generated by use of a first detection signal detected a presence/absence of a signal according to a correlation between a reception signal PPM-modulated at a pulse interval of T and a pulse variation width of τ and the reception signal delayed with a time (T+τ), a second detection signal detected a presence/absence of a signal according to a correlation between the reception signal and the reception signal delayed with a time (T), and a third detection signal detected a presence/absence of a signal according to a correlation between the reception signal and the reception signal delayed with a time (T−τ). By thus combining a plurality of delayed detections, it is possible to obtain a UWB demodulating apparatus configured with a circuit suited for integrated circuit fabrication.

12 Claims, 15 Drawing Sheets

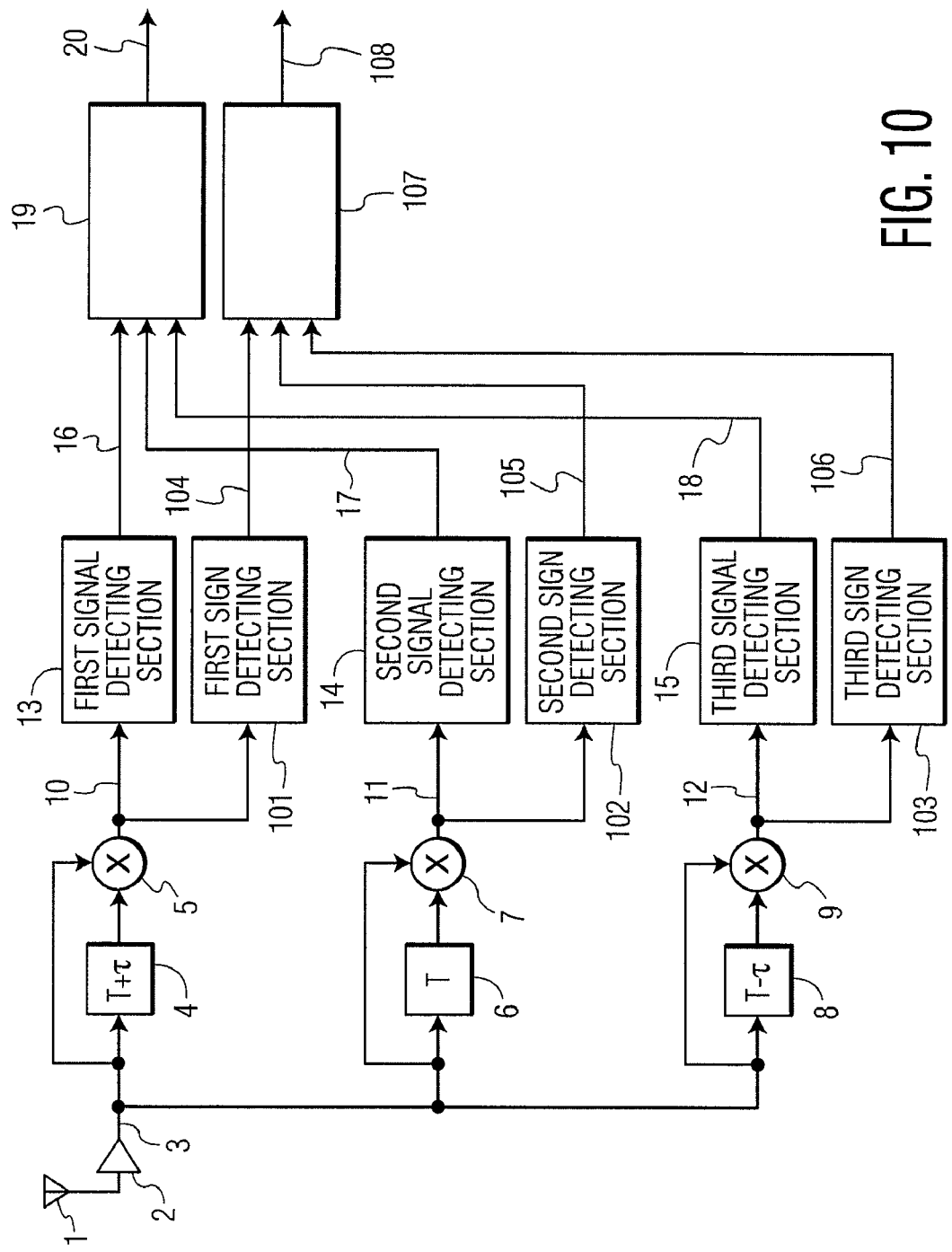

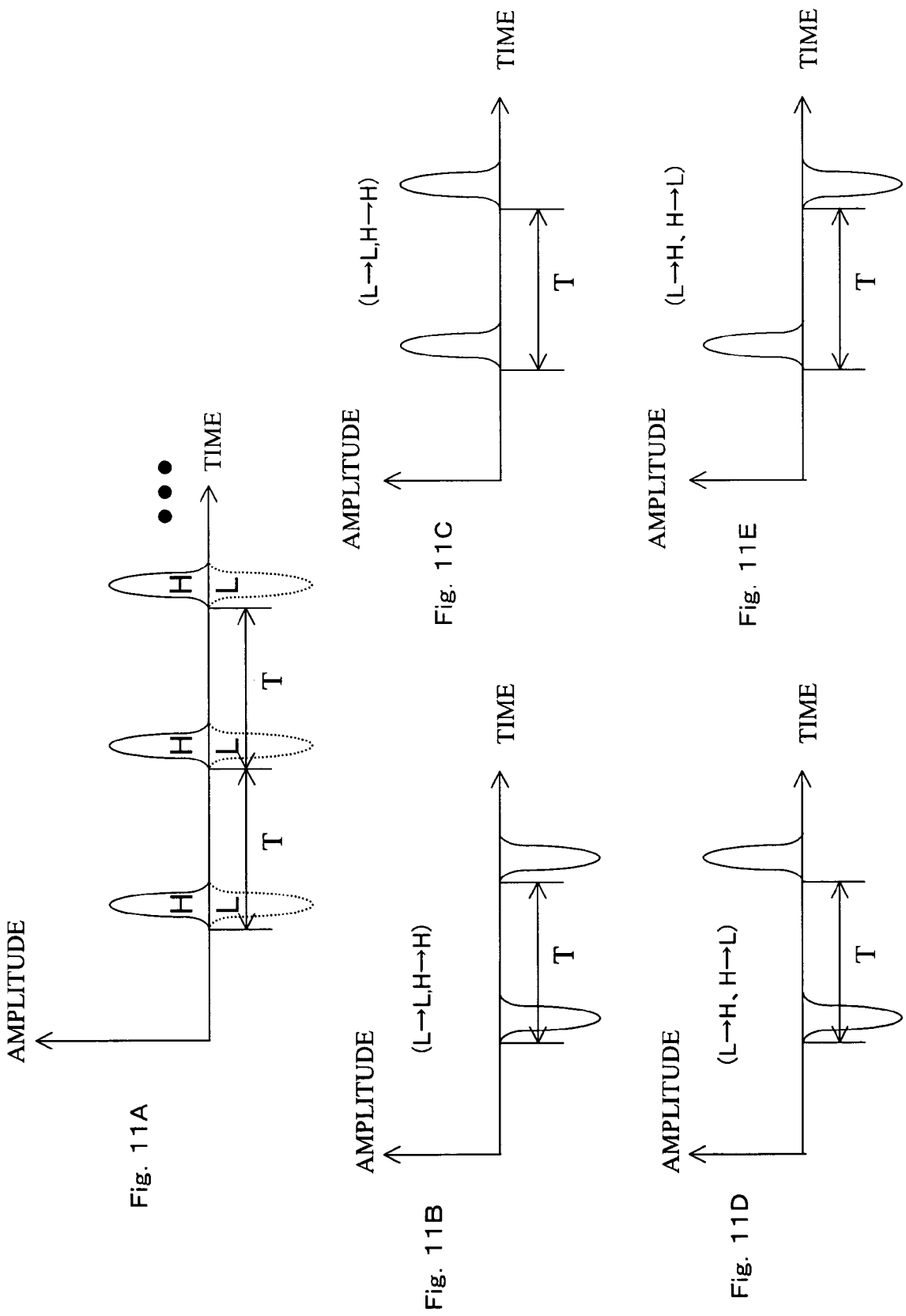

UWB DEMODULATING APPARATUS

FIELD OF THE INVENTION

The present invention relates to a UWB demodulating apparatus applicable suitably for the wireless communication apparatus using a UWB-modulated signal principally.

BACKGROUND OF THE INVENTION

In the mobile communication field, attentions are recently drawn to the wireless communication technology based on impulses, called UWB (Ultra Wide Band), as a communication scheme to realize high speed and low consumption power.

PPM (pulse position modulation) modulation and bi-phase modulation are known as UWB basic modulation schemes. PPM modulation is UWB modulation based on the string of equally spaced impulses, which is of a modulation scheme using impulses positioned deviated slight with respect to the equally spaced interval (time hopping). Concerning PPM modulation, generally there is known a demodulation scheme based on the correlation of waveform to a template (e.g. see a document of Nikkei Electronics, Aug. 26, 2002 No. 829, p. 137-144 "Reason of High Speed Transmission in Ultra Wideband"). Bi-phase modulation is of a modulation scheme based on sign inversion though using a string of equally spaced impulses.

FIG. 1 is an example of a UWB transceiver based on PPM modulation described in the above described document. In the transmitter, a clock generating section 1000 generates a clock pulse 1001 at a regular interval so that a delay section 1002 provides it with a delay corresponding to a transmission data signal 1003. In the timing, a transmission-wave generating section 1004 generates an impulse to thereby transmit a PPM modulation signal at a transmission antenna 1005.

The receiver, a template-waveform generating section 1009 generates a template 1010, in the timing of a clock pulse 1008 generated at the clock generating section 1007. The signal received at a reception antenna 1006 is taken a correlation to the template 1010 by means of a pulse correlator 1011. The correlation result obtained is integrated and demodulated by an integrating section 1012.

The UWB communication scheme configured as above has the following merits, as compared with the conventional communication scheme using the carrier wave.

(1) Low Consumption Power

Less power is required because of a scheme not using a carrier wave always needing a continuous output. This enables to reduce the apparatus consumption power.

(2) Small Size and Low Price

Analog RF components are unnecessary which make it difficult to fabricate a CMOS-based integrated circuit, such as VCOs, RF filters, etc. Furthermore, exact linearity is not needed for the circuit. Accordingly, the scheme is well suited for integrated circuit fabrication, thus facilitating to reduce the size and price of apparatus.

(3) High-Speed Communications

Frequency band is significantly broad because impulses are used in communications, enabling high-speed data communications. In the UWB communications using the microwave band (3 GHz-10 GHz), data communications are available at a rate as high as approximately 100 Mbps.

Nevertheless, because the template waveform generating section 1009 of FIG. 1 is required to generate an exact impulse waveform on the order of nanoseconds, it must be configured on a circuit extremely high in speed requiring linearity. This makes it impossible to make use of the superiority in respect of low power consumption and apparatus low price, a merit in the UWB communication scheme.

Meanwhile, in the circuit of FIG. 1, demodulation is impossible to carry out on both PPM modulation and bi-phase modulation at the same time.

Furthermore, the UWB demodulation scheme, broad in service band, involves a problem of not resistive to interferences of from other wireless communication systems included within the band.

SUMMARY OF THE INVENTION

It is a first object of the present invention to provide a UWB demodulating apparatus configured easy for IC fabrication as a UWB demodulating apparatus adapted for PPM modulation.

It is a second object to provide a UWB demodulating apparatus capable of demodulating for not only PPM modulation but also bi-phase modulation at the same time.

It is a third object to provide a UWB demodulating apparatus configured for delayed detection thereby relieving the unwanted effect not correlated to the pulse interval of UWB modulation in reception.

In order to solve the foregoing problem, a UWB demodulating apparatus comprises: a first delayed-detecting section for detecting a presence/absence of a signal and outputting a first detection signal, according to a correlation between a reception signal PPM-modulated at a pulse interval of T and a pulse variation width of $\tau$ and a signal the reception signal is delayed a time (T+$\tau$); a second delayed-detecting section for detecting a presence/absence of a signal and outputting a second detection signal, according to a correlation between the reception signal and a signal the reception signal is delayed a time (T); a third delayed-detecting section for detecting a presence/absence of a signal and outputting a third detection signal, according to a correlation between the reception signal and a signal the reception signal is delayed a time (T−$\tau$); and a demodulating section for generating a demodulated signal by use of the first, second and third detection signals.

By thus combining a plurality of delayed detections together, circuit arrangement is provided suited for integrated-circuit fabrication. Furthermore, by adding a simple arrangement, it is possible to obtain a UWB demodulating apparatus capable of implementing PPM modulation and bi-phase modulation at the same time.

BRIEF DESCRIPTION OF THE DRAWINGS

FIGS. 3A-3E are waveform diagrams explaining the operation of the UWB demodulating apparatus according to embodiment 1 of the invention wherein FIG. 3A is a reception signal waveform while FIGS. 3B-3E are respectively delayed-detected output waveforms;

FIG. 7A-7C are waveform diagrams explaining the operation of the demodulating section in FIG. 6, wherein FIG. 7A is an input signal to a set terminal, FIG. 7B is an input signal to a reset terminal and FIG. 7C is an output signal;

FIG. 9A-9E are waveform diagrams explaining the operation of the demodulating section in FIG. 8, wherein FIG. 9A is an input signal, FIG. 9B is a clock signal, FIG. 9C is an edge detection signal, FIG. 9D is an exclusive OR signal and FIG. 9E is a demodulated signal;

FIG. 10 is a block diagram showing an arrangement of a UWB demodulating apparatus according to embodiment 2 of the invention;

FIGS. 11A-11E are waveform diagrams explaining the operation of the UWB demodulating apparatus according to embodiment 2 of the invention wherein FIG. 11A is a reception signal waveform while FIGS. 11B-11E are delayed-detected output waveforms;

FIG. 14A-14D are waveform diagrams explaining the operation of the UWB demodulating apparatus according to embodiment 3 of the invention wherein FIG. 14A is a reception signal waveform while FIGS. 14B-14D are delayed-detected output waveforms.

DESCRIPTION OF THE EXEMPLARY EMBODIMENT

Exemplary embodiments of the present invention are demonstrated hereinafter with reference to the accompanying drawings.

1. First Exemplary Embodiment

Figure 2:
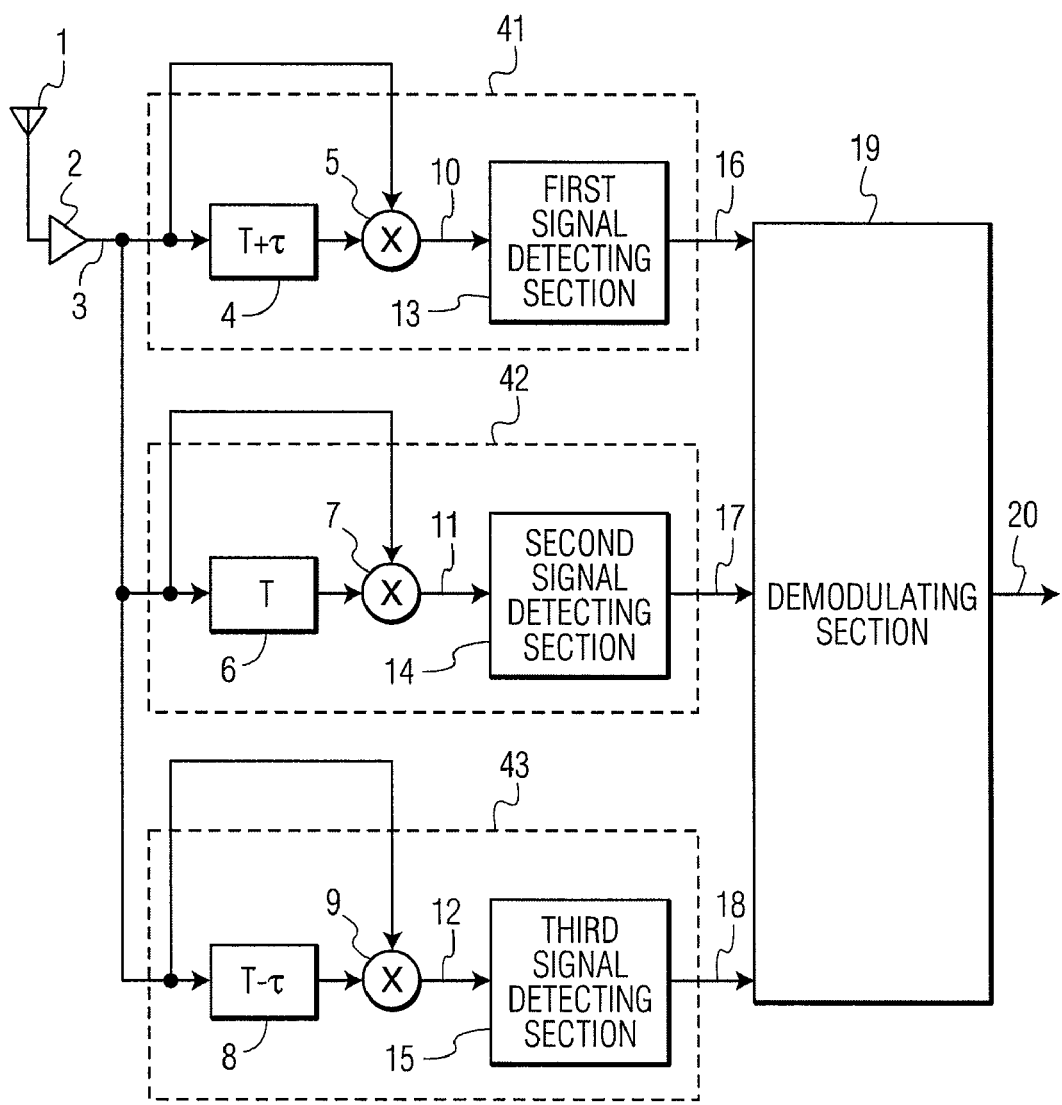
FIG. 2 is a block diagram showing an arrangement of a UWB demodulating apparatus according to embodiment 1 of the present invention.

FIG. 2 is a block diagram showing an arrangement of a UWB demodulating apparatus according to embodiment 1 of the invention. An antenna 1 receives a PPM-modulated radio signal and outputs it to a signal amplifier section 2. The signal amplifier section 2 generates a reception signal 3 that the reception signal received by the antenna 1 is amplified up to an amplitude required for the following stage. The reception signal 3 is outputted to the first signal delay section 4, the second signal delay section 6, the third signal delay section 8, the first mixer section 5, the second mixer section 7 and the third mixer section 9.

A first delay detecting section 41 is configured with a first signal delay section 4, a first mixing section 5 and a first signal detecting section 13. The first signal delay section 4 outputs a signal corresponding to the reception signal 3 delayed with a time T+τ to the first mixing section 5. The first mixing section 5 mixes the reception signal 3 with the signal delayed with a time T+τ, and outputs to a first signal detecting section 13 a first mixed signal 10 as a correlation detection result to the signal the time T+τ before. The first signal detecting section 13 determines a presence or absence of collation to the signal the time T+τ before depending upon a voltage or power value of the first mixed signal 10, and outputs a first detection signal 16 as a result of delayed detection to a demodulating section 19.

A second delay detecting section 42 is configured with a second signal delay section 6, a second mixing section 7 and a second signal detecting section 14. The second signal delay section 6 outputs a signal corresponding to the reception signal 3 delayed with a time T to the second mixing section 7. The second mixing section 7 mixes the reception signal 3 with the signal delayed with a time T, and outputs to a second signal detecting section 14 a second mixed signal 11 as a result of correlation detection to the signal the time T before. The second signal detecting section 14 determines a presence or absence of correlation to the signal the time T before depending upon a voltage or power value of the second mixed signal 11, and outputs a second detection signal 17 as a result of delayed detection to the demodulating section 19.

A third delay detecting section 43 is configured with a third signal delay section 8, a third mixing section 9 and a third signal detecting section 15. The third signal delay section 8 outputs a signal corresponding to the reception signal 3 delayed with a time T−τ to the third mixing section 9. The third mixing section 9 mixes the reception signal 3 with the signal delayed with a time T−τ, and outputs to a third signal detecting section 15 a third mixed signal 12 as a result of correlation detection to the signal the time T−τ before. The third signal detecting section 15 determines a presence or absence of correlation to the signal the time T−τ before depending upon a voltage or power value of the third mixed signal 12, and outputs a third detection signal 18 as a result of delayed detection to the demodulating section 19.

The demodulating section 19 demodulates the PPM modulation from the first detection signal 16, second detection signal 17 and third detection signal 18, and outputs a demodulated signal 20.

Now, the operation of the UWB demodulating apparatus of the invention is explained by using FIG. 3A-3E.

Figure 3A:
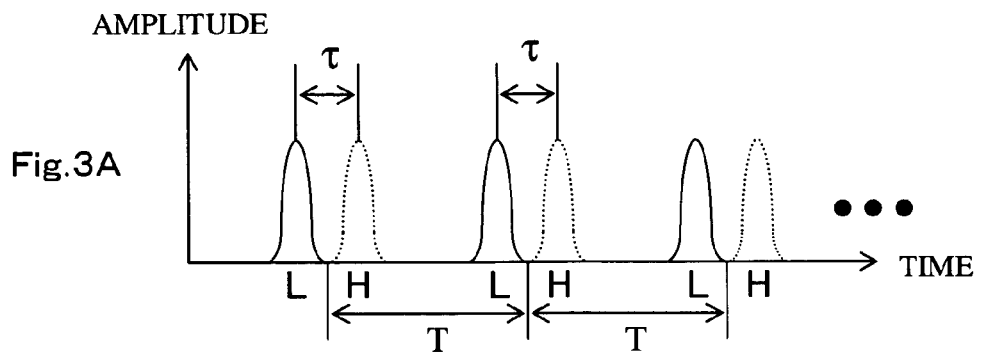

Here, the PPM modulation wave provided on the reception signal 3 is defined as shown in FIG. 3A. Furthermore, the pulse interval is assumed T, the impulse shifted forward a time τ/2 is assumed L and the impulse shifted backward a time τ/2 is assumed H. In PPM modulation, information is to be conveyed by exclusively forwarding any one of the impulses H and L.

Delayed detection detects a transmitted impulse signal with a correlation to a signal preceding the delay time. For example, where there are impulses at a time interval of T, detection results are obtained at the time interval of T in a delayed detection with the delay time T.

Figure 3B:
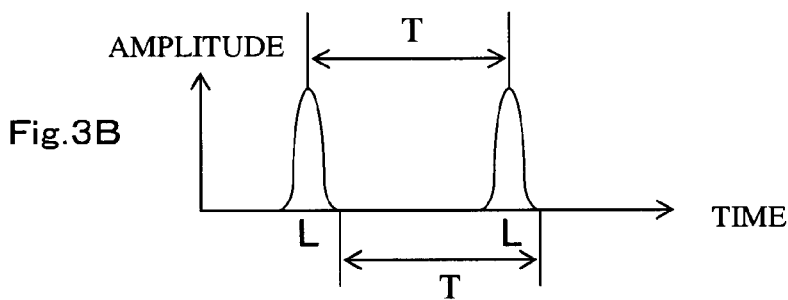
Figure 3C:
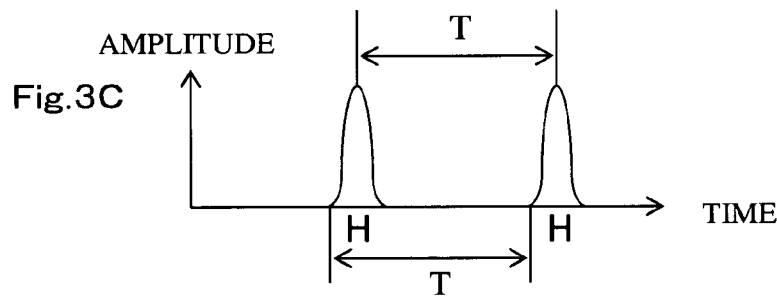
Figure 3D:
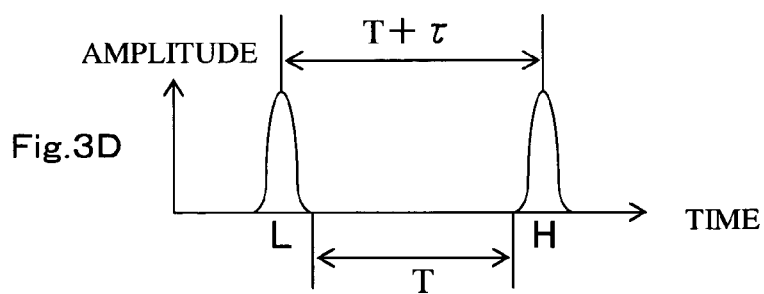

The first detection signal 16, as a result of delayed detection in the first signal detecting section 13, acquires a value when the reception signal 3 has a pulse time interval of T+τ as shown in FIG. 3D. This corresponds to a change of from L to H in PPM modulation of the reception signal 3.

The second detection signal 17, as a result of delayed detection in the second signal detecting section 14, acquires a value when the reception signal 3 has a pulse time interval of T. This corresponds to no sign change in PPM modulation of the reception signal 3, e.g. from L to L in FIG. 3B or from H to H in FIG. 3C.

Figure 3E:
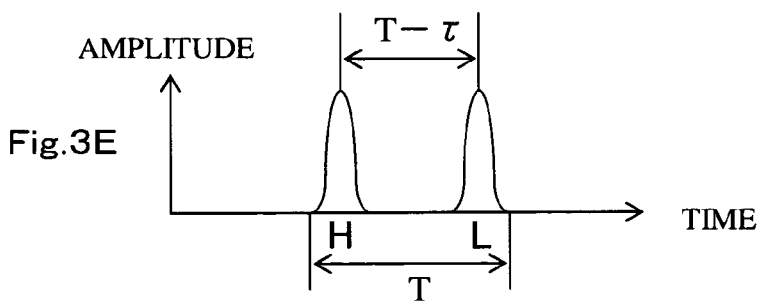

The third detection signal 18, as a result of delayed detection in the third signal detecting section 15, acquires a value when the reception signal 3 has a pulse time interval of T−τ as shown in FIG. 3E. This corresponds to a change of from H to L in PPM modulation of the reception signal 3.

The demodulating section 19 carries out a demodulation on the PPM-modulated wave by the output operation of a determination result L when the first detection signal 16 has a value, a preceding determination result when the second detection signal 17 has a value, or a determination result H when the third detection signal 18 has a value.

Figure 4:
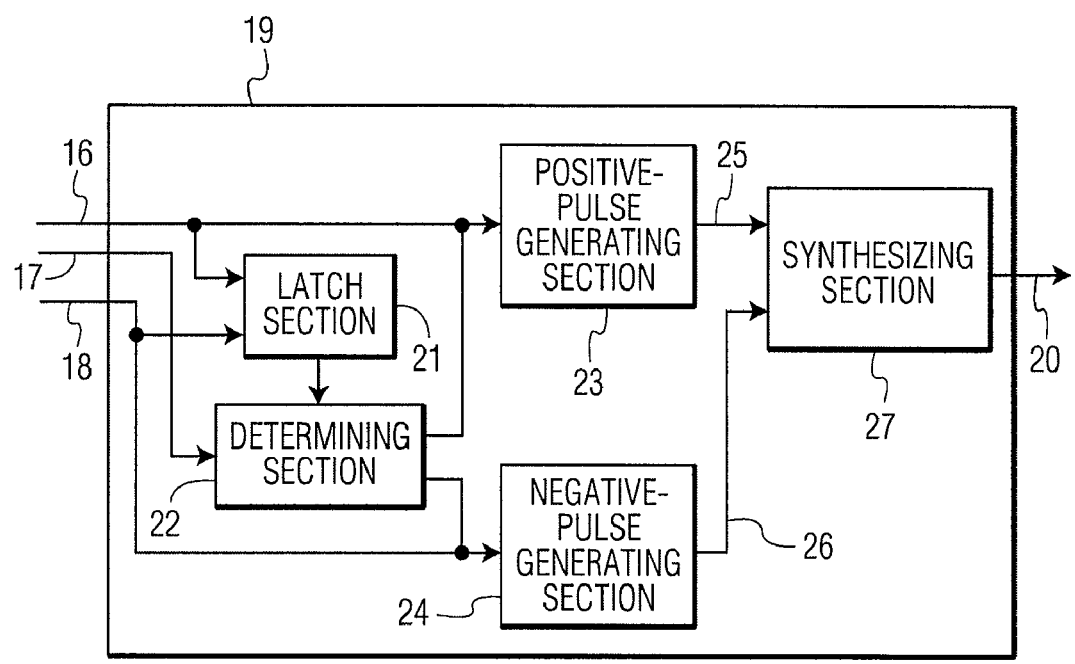
FIG. 4 is a block diagram showing an arrangement of demodulating section of a demodulating section of the UWB demodulating apparatus according to embodiment 1 of the invention.

The demodulation section 19 is explained on a concrete configuration example by using FIG. 4. A latch section 21 holds which has been detected in the last of the first detection signal 16 and the third detection signal 18, and outputs it to the determining section 22. In the case of detecting a second detection signal 17, the determining section 22 outputs a signal for pulse generation to a positive-pulse generating section 23 when the latch section 21 has held a first detection signal, and to a negative-pulse generating section 24 when the latch section 21 has held a third detection signal. The positive-pulse generating section 23, when inputted by a signal, generates a positive-pulse signal 25 having a positive voltage and outputs it to a synthesizing section 27. The negative-pulse generating section 24, when inputted by a signal, generates a negative-pulse signal 26 having a negative voltage and outputs it to a synthesizing section 27. The synthesizing section 27 adds the positive-pulse signal 25 and the negative-pulse signal 26 together, and outputs a demodulated signal 20.

In the FIG. 4 configuration, when there is a first detection signal 16, the latch section 21 holds information for generating a positive pulse. The positive-pulse generating section 23 outputs a positive pulse signal 25 that is to be outputted as a demodulated signal through the synthesizing section 27. Likewise, when there is a third detection signal 18, the latch section 21 holds information for generating a negative pulse. The negative-pulse generating section 24 outputs a negative pulse signal 26 that is to be outputted as a demodulated signal 20 through the synthesizing section 27.

In the case there is a second detection signal 17, the latch section 21 outputs a signal for pulse generation to the positive-pulse generating section 23 when it holds information for a positive pulse, or to the negative-pulse generating section 24 when for a positive pulse. The impulse signal 25, 26 generated positive or negative is passed through the synthesizing section 27, to obtain as a demodulated signal 20 a pulse signal of the same sign as the sign generated last time.

In this manner, the demodulating section 19 is allowed to demodulate the PPM-modulated wave by the output operation of a determination result L when a first detection signal 16 has a value, a preceding determination result when a second detection signal 17 has a value, or a determination result H when a third detection signal 18 has a value.

Figure 5:
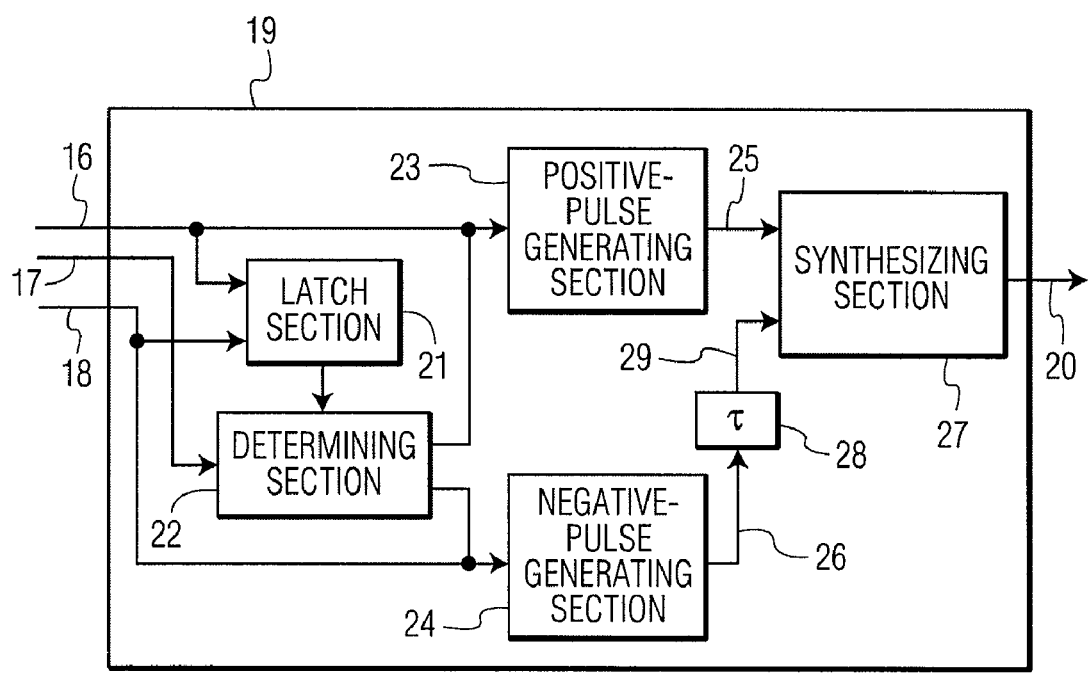
FIG. 5 is a block diagram showing another arrangement of a demodulating section of the UWB demodulating apparatus according to embodiment 1 of the invention.

Incidentally, in the FIG. 4 arrangement, there is a possibility to cause a jitter on the demodulated signal 20 due to a detection time difference between a plurality of delayed detections, resulting in a lower of reception sensitivity. FIG. 5 is a block diagram showing an arrangement of a demodulating section 19 removing the jitter as caused on the demodulated signal 20 and improving reception sensitivity. The demodulating section 19 of FIG. 5 is different from the demodulating section 19 of FIG. 3A-3E in that a slight-delay section 28 is provided for delaying an input signal by a time τ thereby removing jitter. The other arrangement elements are similar to those of FIG. 4, which are attached with the same reference numerals to omit detailed explanation.

As shown in FIG. 3A-3E, a result of delayed detection takes place as a pulse is caused. The pulse signal caused upon the impulse H is delayed by a time τ relative to the pulse signal caused upon the impulse L. For this reason, by delaying the L pulse signal by τ, the generation timing of the pulse signals H and L can be made at an equal interval.

Accordingly, in FIG. 5, jitter can be removed by outputting to a synthesizing section 27 a signal 29 which is obtained by delaying the negative pulse signal 26 outputted from the negative-pulse generating section 24 with a time T by the slight delay section 28.

In this manner, according to the UWB demodulating apparatus of embodiment 1, a PPM-modulated reception wave is modulated based upon a plurality of delayed detection results. This provides a simplified circuit arrangement easy for IC fabrication and eliminated the need of a waveform-correlation detecting mechanism required in the conventional, thus easily reducing power consumption.

Meanwhile, by the arrangement of delayed detection, it is possible to relieve the unwanted affections in other modulation schemes that are not correlated to the pulse interval in the receiving UWB-modulation.

Figure 6:
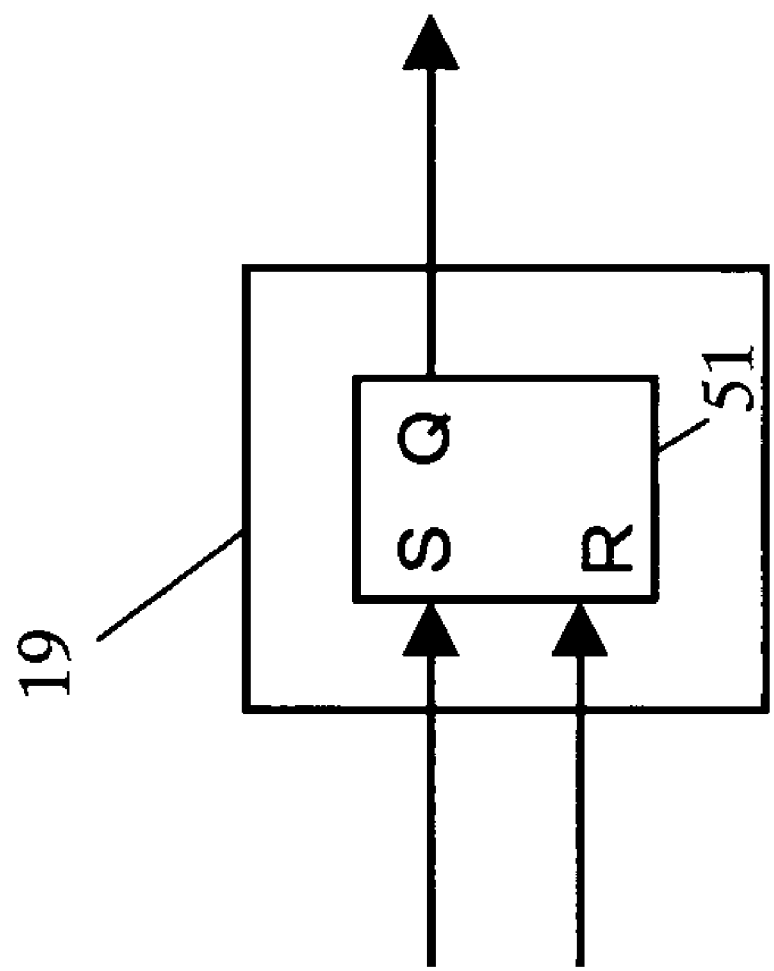
FIG. 6 is a block diagram showing still another arrangement of a demodulating section of the UWB demodulating apparatus according to embodiment 1 of the invention.

FIG. 6 is a block diagram showing another arrangement of the demodulating section 19. The demodulating section 19 of FIG. 6 is different from the demodulating section 19 of FIG. 4 in that only the first detection signal 16 and third detection signal 18 in FIG. 4 are used without the need of a second detection signal 17.

As in the foregoing, the first detection signal 16 shown in FIG. 2 obtains a value when the reception signal 3 has a pulse time interval of T+τ shown in FIG. 3D. This corresponds to a change of PPM modulation of from L to H of the reception signal 3. Likewise, the third detection signal 18 obtains a value when the reception signal 3 has a pulse time interval of T−τ shown in FIG. 3E. This corresponds to a change of PPM modulation of from H to L of the reception signal 3.

From those, by the output operation of a determination result L in the case the first detection signal 16 has a value and determination result H in the case the third detection signal 18 has a value, the demodulating section 19 can demodulate the PPM-modulated wave even by the arrangement omitted of the second detection signal 17. Specifically, the demodulating section 19 can be configured by an SR-type flip-flop 51 shown in FIG. 6. The SR-type flip-flop 51 is a circuit that, by an input signal is exclusively provided to the S (set) terminal and R (reset) terminal, the output signal of from a Q terminal is changed.

Figure 7:
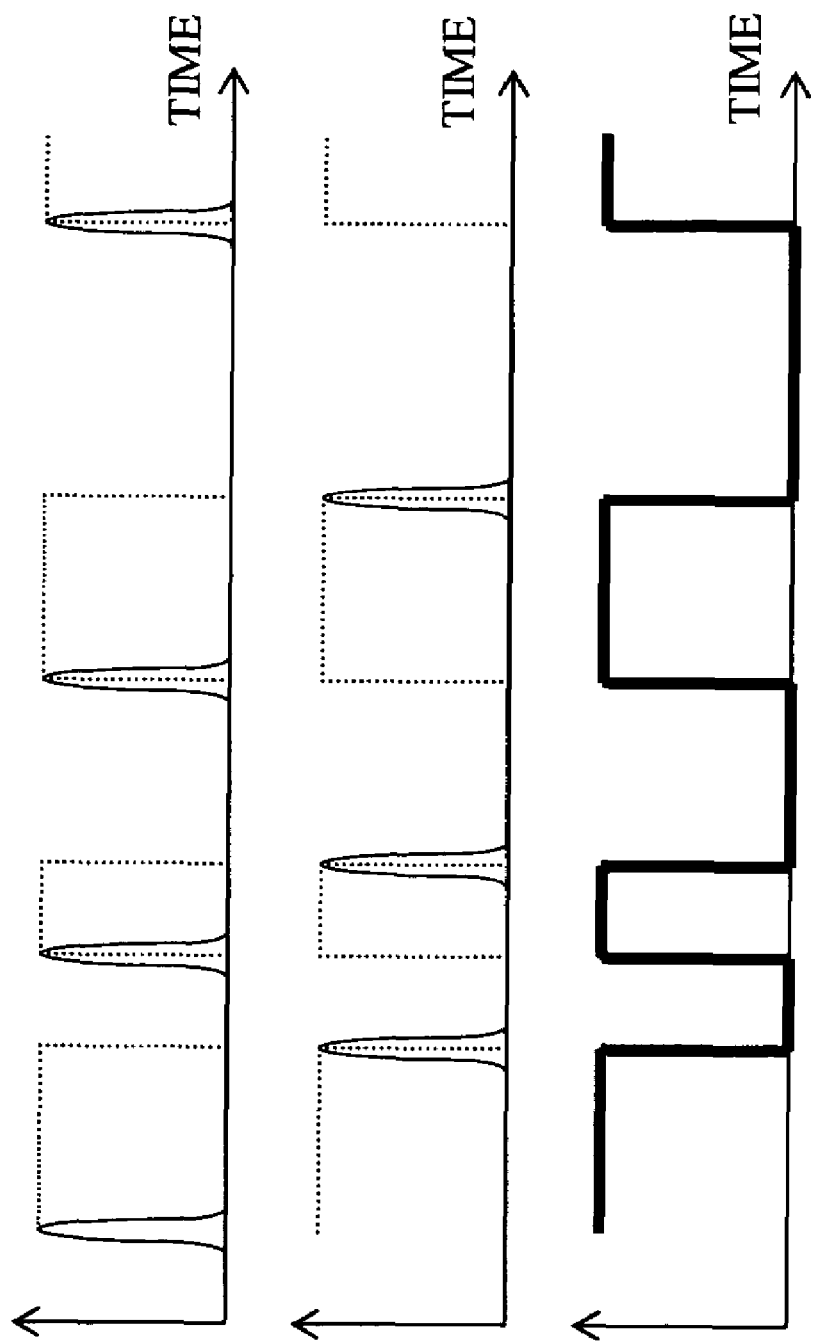

The signal shown in FIG. 7A is inputted to the S terminal of the SR-type flip-flop 51 while the signal shown in FIG. 7B is inputted to the R terminal. The solid line in FIG. 7A is a first detection signal 16 while the broken line is PPM modulation data. Meanwhile, the solid line in FIG. 7B is a third detection signal 17 while the broken line is PPM modulation data. In the case of detecting a change in PPM modulation from L to H on the reception signal 3, a signal H is supplied to the S input while L signal is to the R input, providing an output signal H. Likewise, in the case of detecting a change in PPM modulation from H to L on the reception signal 3, a signal L is supplied to the S input while H signal is to the R input, providing an output signal L. By these operations, an output signal shown in FIG. 7C is obtained at the Q terminal of the SR-type flip-flop 51. Thus, demodulation is effected on the PPM-modulated data.

Incidentally, the SR-type flip-flop circuit 51 operates unstable if H be inputted to the both inputs S, R. However, there is no possibility that H is inputted simultaneously to the both terminals S, R as shown in FIGS. 7A and 7B, thus causing less problem.

This circuit arrangement can omit the circuit configuration included in the second delayed-detecting section 42 of FIG. 2, e.g. the second signal delay section 6, the second mixing section 7 and the second signal detecting section 14. Meanwhile, because the demodulating section 19 can be realized by a simple circuit arrangement, cost and power consumption can be reduced by decreasing the circuit scale.

Figure 8:
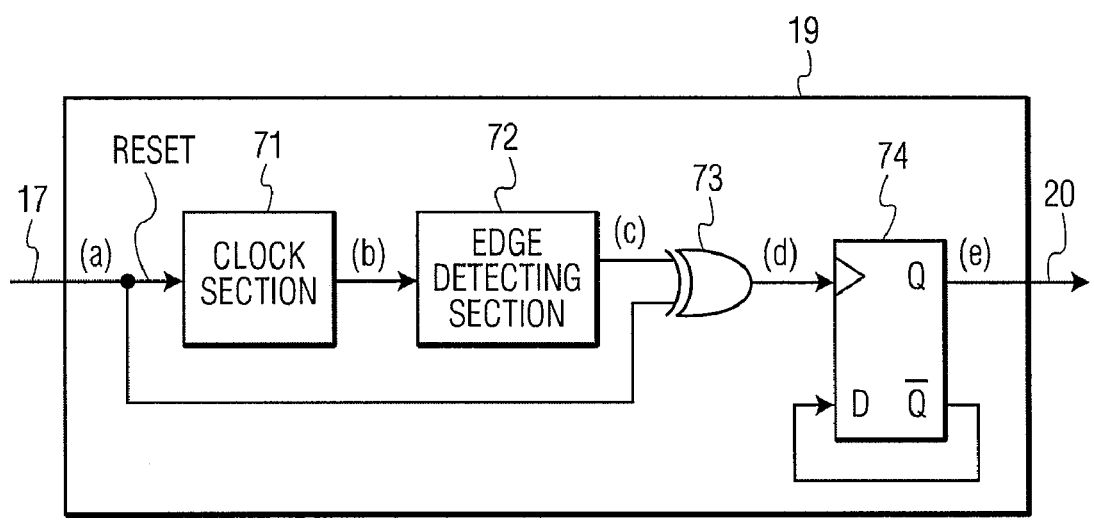
FIG. 8 is a block diagram showing further another arrangement of a demodulating section of the UWB demodulating apparatus according to embodiment 1 of the invention.

FIG. 8 is a block diagram showing an arrangement that the demodulating section 19 is further simplified in configuration to thereby decrease the circuit scale. The demodulating section 19 of FIG. 8 is different from the demodulating section 19 of FIG. 3A-3E in that it uses only the second detection signal 17 without the need of the first detection signal 16 and third detection signal 18.

As in the foregoing, the second detection signal 17 of FIG. 2 obtains a value when the reception signal 3 has a pulse time interval of T shown in FIG. 3B or 3C. This corresponds to an absence of sign change in PPM modulation on the reception signal 3, i.e. from L to L or from H to H. Namely, when the reception signal 3 changes from L to H or H to L in sign, the second detection signal 17 is absent.

Consequently, in the case that, in the demodulating section 19, the second detection signal 17 does not have a value for a time T, the operation of inverting the output signal at a time interval of T makes it possible to demodulate a PPM-modulated wave in the arrangement omitted of a first detection signal 16 and third detection signal 18.

Specifically, the demodulating section 19 can be realized by an arrangement shown in FIG. 8. A clock section 71 uses a second detection signal 17 as a reset input. When a signal is inputted to the reset input, the clock section 71 in the initial state (H in this example) generates a clock signal at a time interval of T. When no signal is detected at the reset input for a time T or longer, it outputs a clock signal having a period of time T to an edge detecting section 72. The edge detecting section 72 detects a sign change of the input signal and outputs an edge-detection signal in a pulse form to an exclusive OR circuit 73. The exclusive OR circuit 73 outputs an exclusive OR of the output signal of the edge detecting section 72 and the second detection signal 17, to a clock input of a D-type flip-flop 74. The D-type flip-flop 74 has a data-inverted output connected to its data input. Each time a clock is inputted, it inverts the polarity of a data output signal and outputs it as a demodulated signal 20 of from the demodulating section 19.

Figure 9A:
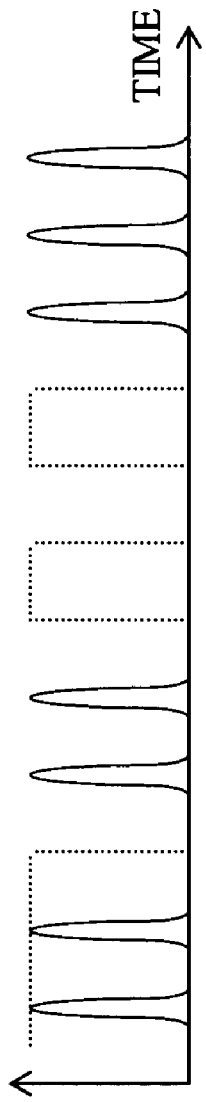
Figure 9B:
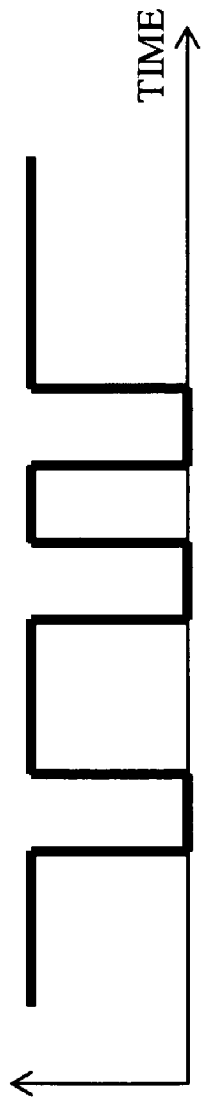
Figure 9C:
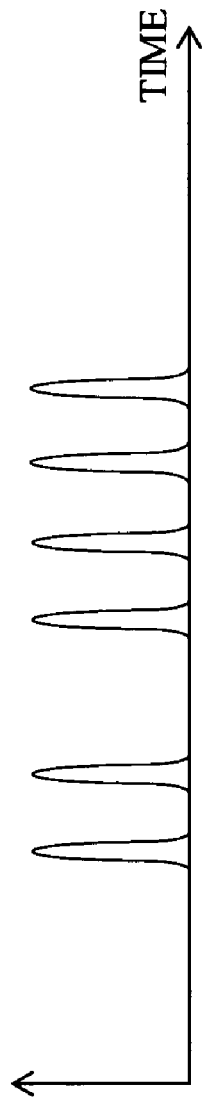
Figure 9D:
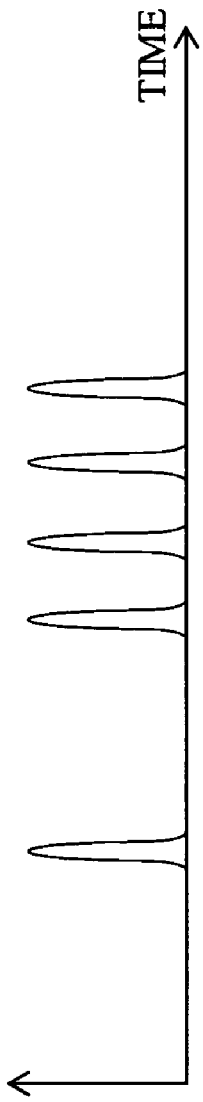
Figure 9E:
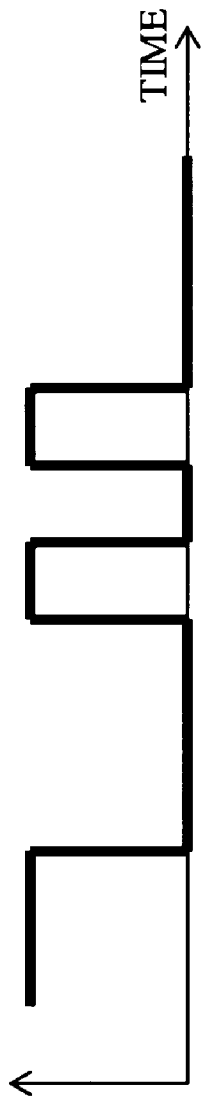

FIGS. 9A-9E are signal waveform diagrams on each point in FIG. 8. In FIG. 9A, the broken line represents a PPM-modulated signal while the solid line a second detection signal 17. FIG. 9B shows a clock signal while FIG. 9C an edge detection signal, FIG. 9D an exclusive OR signal, and FIG. 9E a demodulated signal 20.

In the circuit configuration of FIG. 8, a second detection signal 17 is detected only when the PPM modulation does not change from L to L or H to H on the reception signal 3. In this case, a clock section 71 takes the initial state H because a signal is inputted to its reset input. On the other hand, when the PPM modulation changes from L to H or from H to L, there is no detection of a second detection signal 17. Accordingly, because the reset input of the clock section 71 is in a state free of a reset input over a time T or longer, a clock signal is started to output.

Here, in the case that there is a reset input when the clock signal is L, the clock section 71 returns to the initial H state despite there is no state transition in the PPM modulation, causing a change in the clock output signal. In order to eliminate the change in the clock output signal, the exclusive OR circuit 73 detects a fact that, when the edge detecting section 72 detects a clock-signal polarity change, a reset input is occurring simultaneously. In this case, a pulse is not allowed to pass the D-type flip-flop 74. By this configuration, an exclusive OR signal (FIG. 9D) is caused only when there is no detection of a second detection signal 17. Because the D flop-flop 74 is configured to invert its output signal depending upon a clock input, a modulated signal 20 shown in FIG. 9E can be obtained by taking the exclusive OR signal (FIG. 9D) as a clock input and inverting the output signal.

According to this arrangement, because it is possible to omit the circuit configuration as involved in the first delayed-detecting section 41 and third delayed detecting section 43, e.g. the first signal delay section 4, the third signal delay section 8, the first mixing section 5, the third mixing section 9, the first signal detecting section 13 and the third signal detecting section 15. This makes it possible to reduce cost and consumption power owing to circuit-scale reduction.

2. Second Exemplary Embodiment

Embodiment 2 explains an example to receive a modulation wave that bi-phase modulation is added to PPM modulation.

Figure 1:
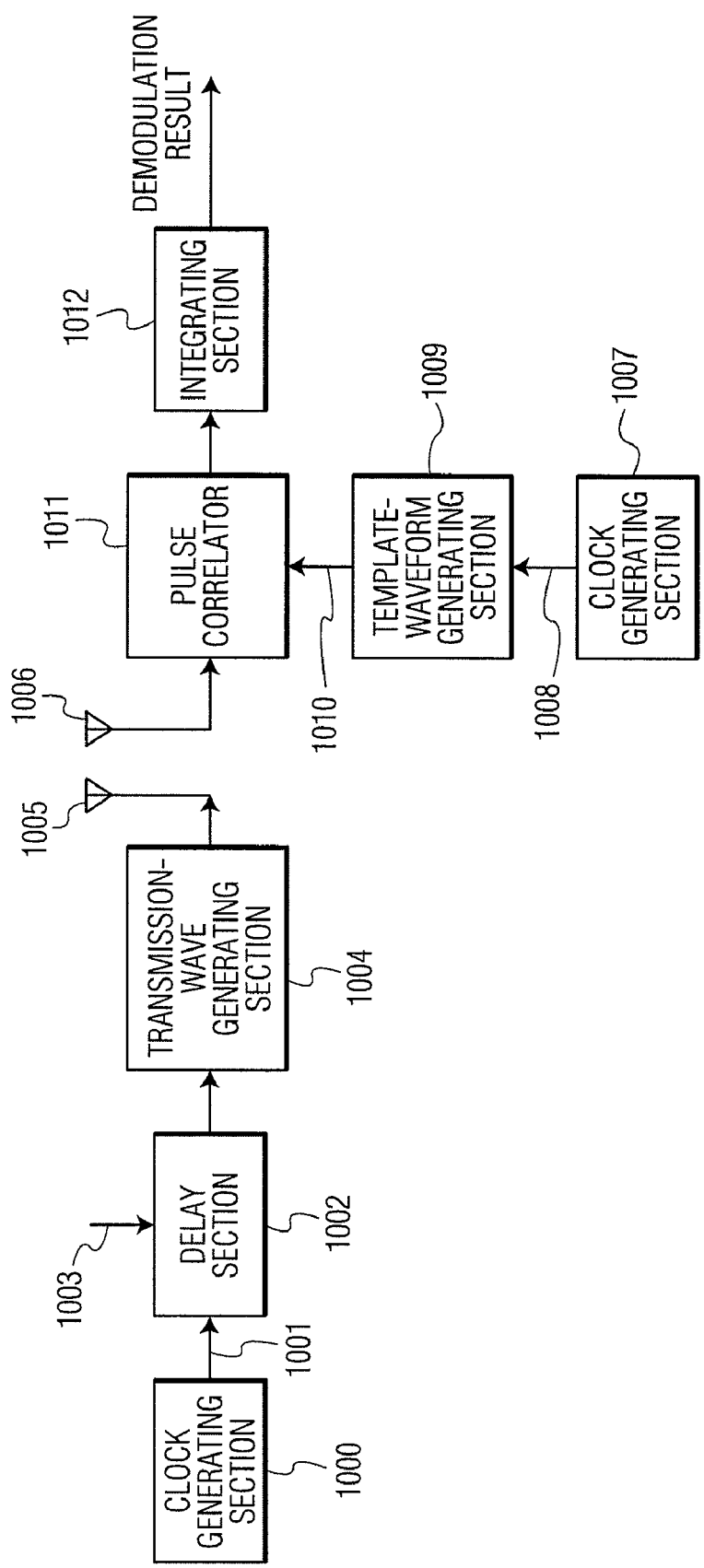
FIG. 1 is a block diagram showing an example of a UWB transceiver in the prior art.

FIG. 10 is a block diagram showing an arrangement of a UWB demodulating apparatus according to embodiment 2 of the invention. The same arrangement elements as those of FIG. 2 are attached with the same reference numerals, thereby omitting detailed explanation. The UWB demodulating apparatus of FIG. 10 comprises a first sign-detecting section 101, a second sign-detecting section 102, a third sign-detecting section 103 and a second demodulating section 107. This is different from the UWB demodulating apparatus of FIG. 1 in that demodulation is to be effected on a bi-phase modulated signal.

The first mixing section 5 mixes the reception signal 3 with the reception signal 3 delayed with a time T+τ, to thereby output to the first sign-detecting section 101 a first mixed signal 10 as a result of delayed detection based on a correlation to the reception signal preceding by a time T+τ. The first sign-detecting section 101 detects a sign positive or negative as a result of delayed detection from a voltage value of the first mixed signal 10, and outputs a first sign-detected signal 104 to the second demodulating section 107.

The second mixing section 7 mixes the reception signal 3 with the reception signal 3 delayed with a time T, to thereby output to the second sign-detecting section 102 a second mixed signal 11 as a result of delayed detection based on a correlation to the reception signal preceding by a time T. The second sign-detecting section 102 detects a sign positive/negative as a result of delayed detection from a voltage value of the second mixed signal 11, and outputs a second sign-detected signal 105 to the second demodulating section 107.

The third mixing section 9 mixes the reception signal 3 with the reception signal 3 delayed with a time T−τ, to thereby output to the third sign-detecting section 103 a third mixed signal 12 as a result of delayed detection based on a correlation to the reception signal preceding by a time T−τ.

The third sign-detecting section 103 detects a sign positive/negative sign as a result of delayed detection from a voltage value of the third mixed signal 12, and outputs a third sign-detected signal 106 to the second demodulating section 107.

The second demodulating section 107 detects a signal change of bi-phase modulation from a value of the first sign-detected signal 104, a second sign-detected signal 105 and a third sign-detected signal 106, and outputs a second demodulated signal 108 therefrom.

Now, explanation is made on the operation of the UWB demodulating apparatus according to the embodiment invention, together with FIG. 11A-11E. In bi-phase modulation, the positive/negative of the reception signal 3 is changed depending upon its transmission sign, thereby implementing information conveyance. As shown in FIG. 11A, it is assumed that the reception signal 3 is a positive pulse when the transmission sign is H and a negative pulse when it is L. When there is a change of transmission sign, the detection signal obtained in delayed detection is negative because of H×L=negative and L×H=negative, as shown in FIG. 11B. Likewise, when the transmission sign is the same sign as the preceding bit, it is positive because of H×H=positive and L×L=positive, as shown in FIG. 11C.

Accordingly, by detecting signs of the first mixed signal 10, the second mixed signal 11 and the third mixed signal 12 respectively, a change of transmission sign can be detected. In case detecting a transmission sign from a change of transmission sign in the second demodulating section 107, demodulation is possible for bi-phase modulation.

Specifically, when any of the first mixed signal 10, the second mixed signal 11 and the third mixed signal 12 has a value in the first sign-detecting section 101, the second sign-detecting section 102 and the third sign-detecting section 103, the sign positive/negative is determined from a voltage value thereof. The respective determination results are outputted as a first sign-detected signal 104, a second sign-detected signal 105 and a third sign-detected signal 106 to the second demodulating section 107.

The second demodulating section 107 holds the sign outputted last time, and outputs a demodulated signal with the same sign as the sign outputted last time when having a positive value on the first sign-detected signal 104, the second sign-detected signal 105 and the third sign-detected signal 106 and with the inverted sign to the sign outputted last time when having a negative value thereon.

Figure 12:
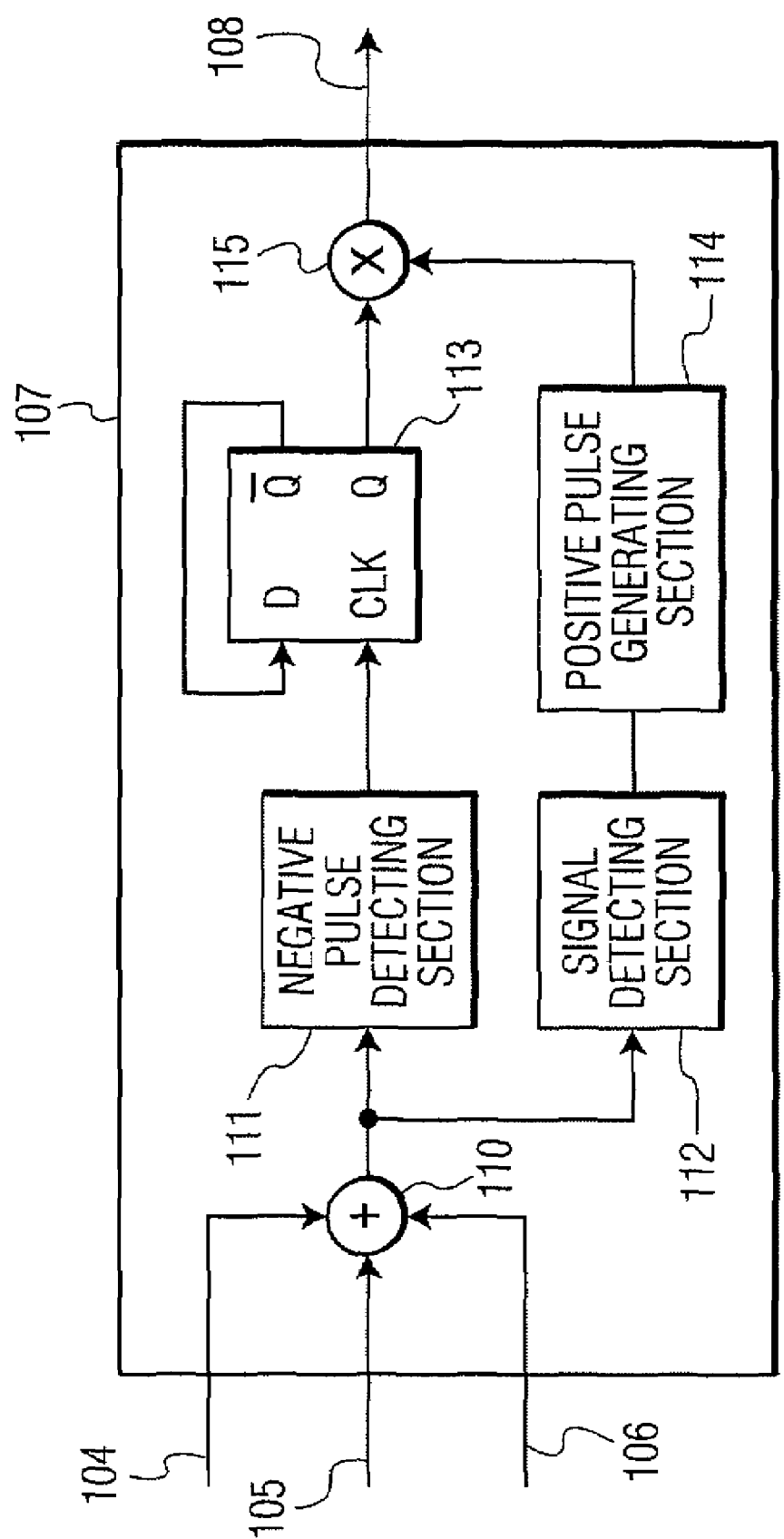
FIG. 12 is a block diagram showing an arrangement of a demodulating section of the UWB demodulating apparatus according to embodiment 2 of the invention.

The second demodulating section 107 can be realized by the configuration shown in FIG. 12, for example. An adding section 110 sums up the voltages of the first sign-detected signal 104, the second sign-detected signal 105 and the third sign-detected signal 106, and outputs an addition result to a negative pulse detecting section 111 and to a signal detecting section 112. The negative pulse detecting section 111, only when the input signal is a negative pulse, outputs an impulse signal to a clock terminal of a D flip-flop 113. The D flip-flop 113 has an inverted output terminal connected to a data input terminal thereof, and a data output terminal from which a signal inverted in output signal sign is outputted to a fourth mixing section 115 when there is an input signal.

The signal detecting section 112 outputs a signal to a positive-pulse generating section 114 when a pulse sign in any of positive or negative from a power value of the input signal. The positive-pulse generating section 114, when there is an input signal, outputs a positive pulse to the fourth mixing section 115.

The fourth mixing section 115 mixes the output signals of from the D flip-flop 113 and the positive-pulse generating section 114, to thereby output a second demodulated signal 108. Namely, the fourth mixing section 115 outputs a pulse signal inverted in the sign held on the D flip-flop 113 when there is a negative pulse in any of the inputs to the second demodulating section 107. It outputs a pulse signal equal in sign to the sign held on the D flip-flop 113 when there is a positive pulse. This signal is a desired bi-phase demodulated signal. Thus, a demodulating section is obtained for desired bi-phase modulation.

The bi-phase modulation configuration of this embodiment is effective in the use of bi-phase modulation simultaneous with PPM modulation because of the capability of obtaining a demodulation result independently of the demodulation configuration on PPM modulation.

Meanwhile, it is apparent that the arrangement of the invention is effective even where using bi-phase modulation only.

According to this embodiment, where PPM modulation and bi-phase modulation are applied simultaneously, demodulations can be made simultaneously on the both by separately obtaining a demodulation result of PPM modulation by the modulating section and a demodulation result of bi-phase modulation by the second modulating section.

3. Third Exemplary Embodiment

Figure 13:
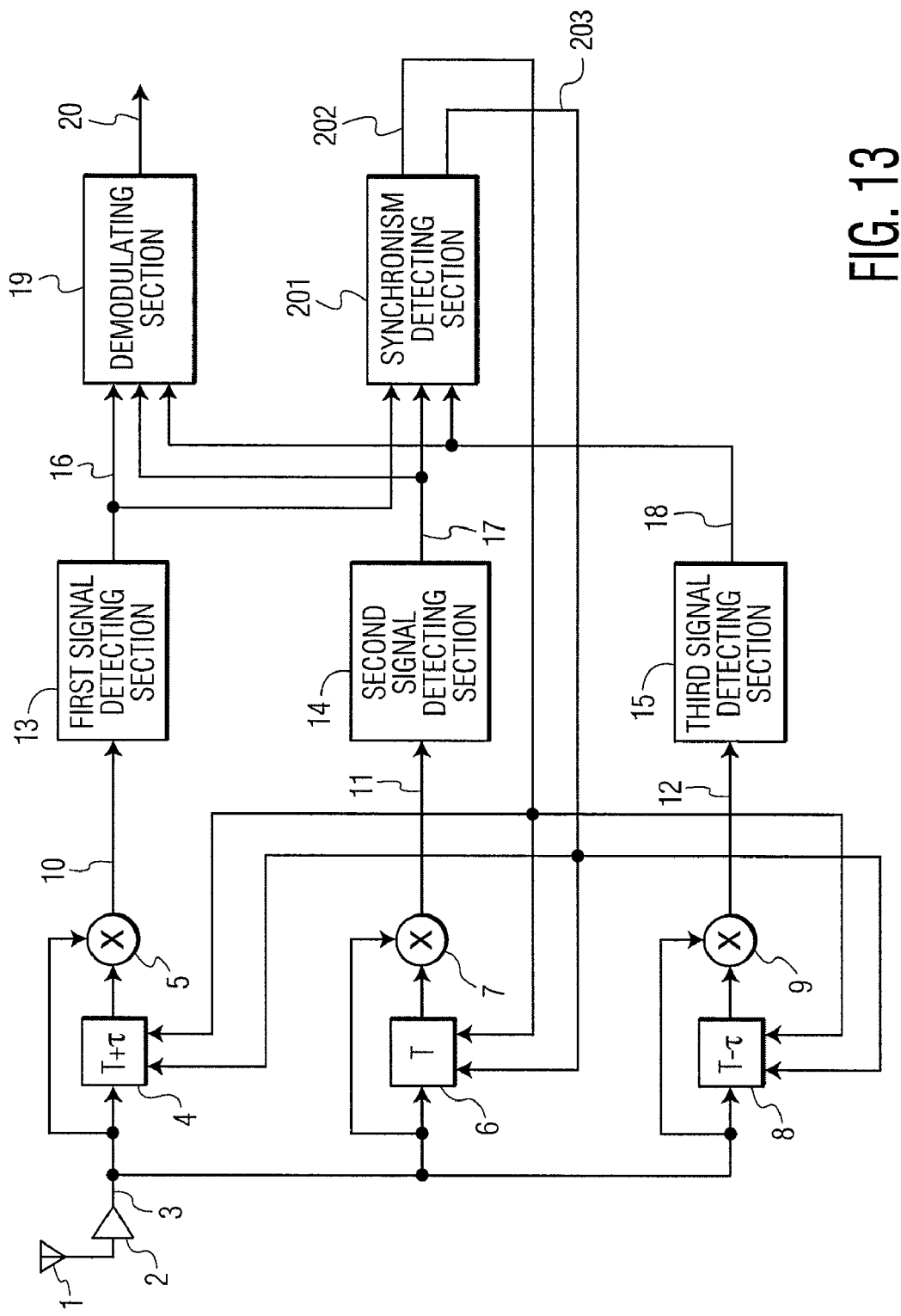
FIG. 13 is a block diagram showing an arrangement of a UWB demodulating apparatus according to embodiment 3 of the invention.

FIG. 13 is a block diagram showing an arrangement of a UWB demodulating apparatus of embodiment 3. This embodiment is to capture a synchronism during reception. The constituent elements of FIG. 2 are attached with the same references, to thereby omit detailed explanation.

The UWB demodulating apparatus of FIG. 13 is different from the UWB demodulating apparatus of FIG. 2 in that a synchronism detecting section 201 is provided to give information for adjusting a delay time of a first signal delay section 4, second signal delay section 6 and third signal delay section 8. Meanwhile, the first signal delay section 4, the second signal delay section 6 and the third signal delay section 8 each have a delay time T to be varied according to an external signal.

The synchronism detecting circuit 201 outputs, to the first signal delay section 4, second signal delay section 6 and third signal delay section 8, information for adjusting the time T for delayed detection longer when there are detected a plurality of signals of among a first detection signal 16, a second detection signal 17 and a third detection signal 18 and followed by detecting singly a first detection signal 16, and information for adjusting the time T for delayed detection shorter when there are detected a plurality of signals of among a first detection signal 16, a second detection signal 17 and a third detection signal 18 and followed by detecting singly a third detection signal 18.

Figure 14:
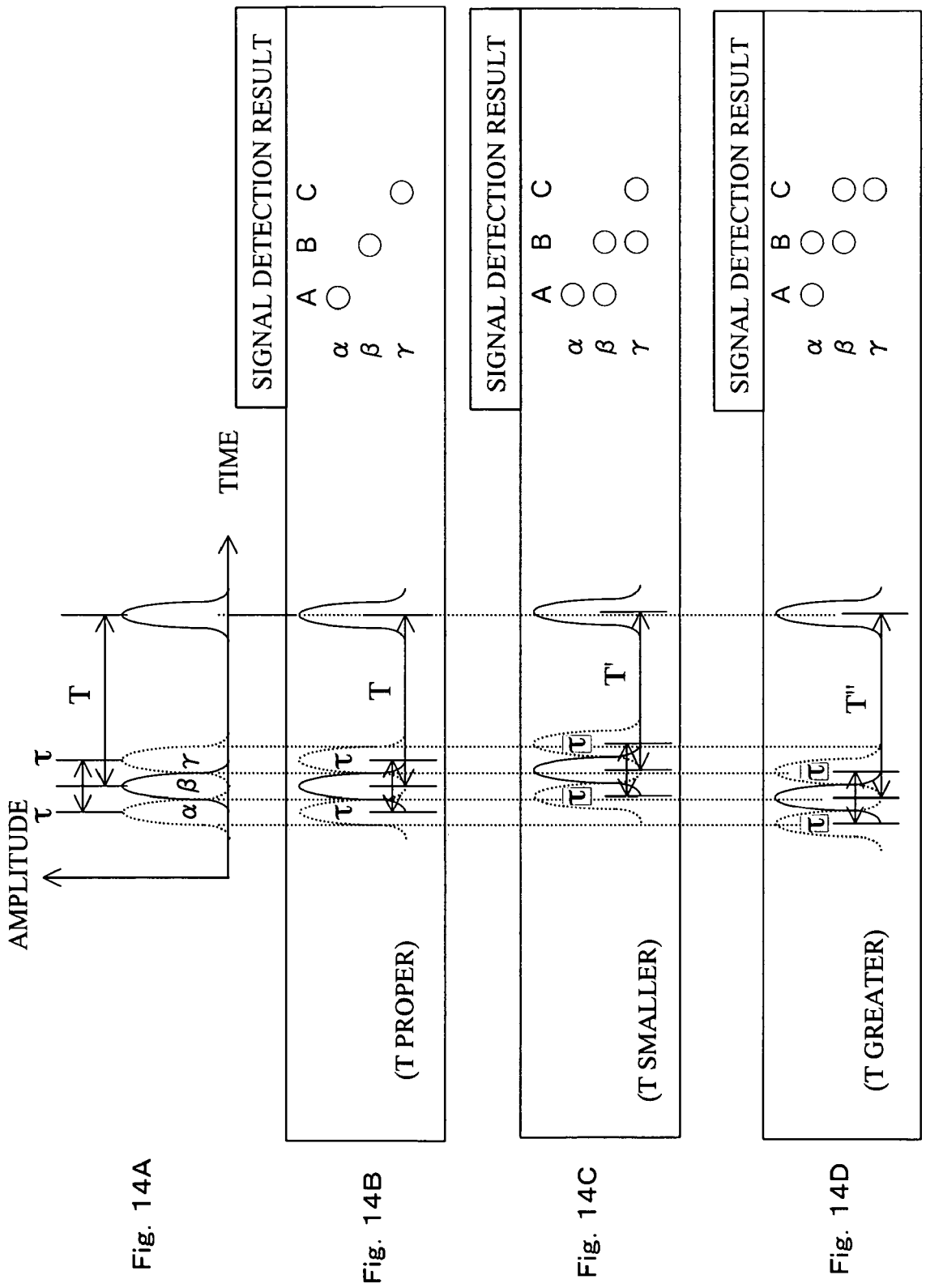

Now, explanation is made on the operation of the UWB demodulating apparatus of FIG. 13 by using FIG. 14A 14D. Although the signal delay time T in the first signal delay section 4, second signal delay section 6 and third signal delay section 8, ideally, is to be equal to the pulse interval of the reception signal 3, there are actually cases that deviation is caused by the affection of circuit temperature characteristic, etc.

Where a receiving PPM signal takes α, β or γ and a delay time T is proper as shown in FIG. 14A, there can be obtained only a first detection signal A for the PPM signal α, only a second detection signal B for the PPM signal β, and only a third detection signal C for the PPM signal γ.

However, in the case that the delay time T is shorter than the pulse interval of the reception signal 3, it is expected to obtain a plurality of detection signals, e.g. as shown in FIG. 14C, a first detection signal A for the PPM signal α, a first detection signal A and second detection signal B for the PPM signal β, and a second detection signal B and third detection signal C for the PPM signal γ. Similarly, in the case that the delay time T is longer than a desired delay time, it is expected to obtain a plurality of detection signals, e.g. as shown in FIG. 14D, a first detection signal A and second detection signal B for the PPM signal α, a second detection signal B and third detection signal C for the PPM signal β, and a third detection signal C for the PPM signal γ.

Meanwhile, where the deviation of circuit delay time T is attributable to temperature characteristic or the like, the variation in time is comparatively moderate. For this reason, there is less variation of deviation values in a duration to receive several symbols. Accordingly, the synchronism detecting section 201, when obtaining simultaneously a plurality of ones of first to third detection signals as in FIG. 14C or 14D, determines that the circuit delay time T is in deviation with respect to the defined value.

In the case that the detection signal thereafter obtained singly is a first detection signal, if it is a first detection signal, the delay time T in delayed detection is considered excessively small in setting value. If it is a third detection signal, the delay time T is considered excessively great in setting value. The synchronism detecting section 201 provides the information for adjusting the delay time to the first signal delay section 4, the second signal delay section 6 and third signal delay section 8, thereby approximating the delay time T to a desired value.

Figure 15:
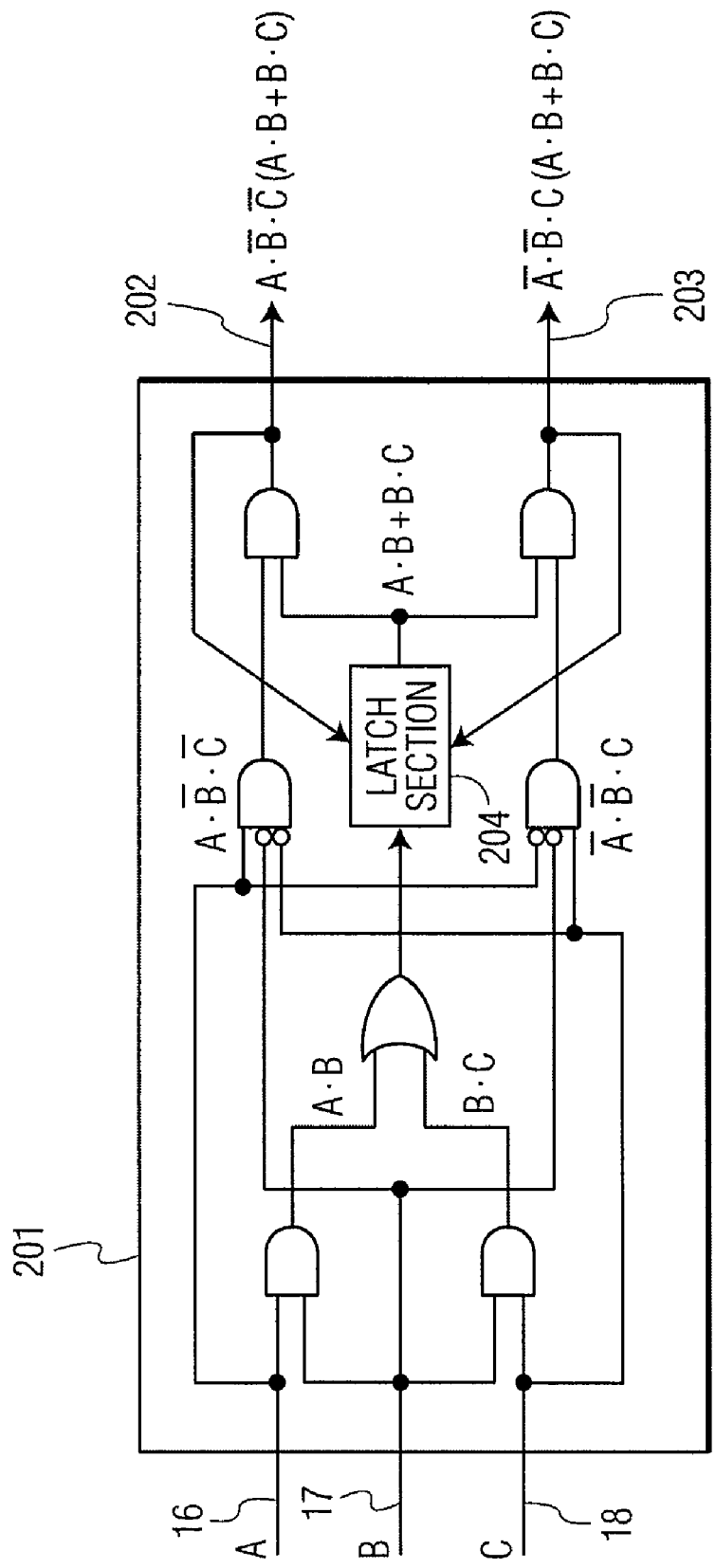
FIG. 15 is a block diagram showing an arrangement of a synchronism detecting section of the UWB demodulating apparatus according to embodiment 3 of the invention.

FIG. 15 is a circuit arrangement of the synchronism detecting section 201. Here, in order to simplify explanation, a first detection signal 16 is assumed A, a second detection signal 17 is B, and a third detection signal 18 is C (A, B and C are functions in time).

A latch section 204 has an input signal of A·B+B·A. When there is an input H, the value H is held until there is a reset input from a first synchronism control signal 202 or a second synchronism control signal 203. When there is a reset input, a value L is outputted. In the case that the delay time T in the first signal delay section 4, second signal delay section 6 and third signal delay section 8 of FIG. 13 is smaller than a desired value, detected is any of sole A, a combination of A and B, and a combination of B and C. When detected is a combination of A and B or B and C, the latch section 204 outputs H. Thereafter, when A is detected singly, a first synchronism control signal 202 is outputted. Meanwhile, the first synchronism control signal 202 is supplied also to a rest input of the latch section 204 where it releases the hold operation of the latch section 204 to thereby providing an output signal L.

Likewise, in the case that the delay time T of the first signal delay section 4, second signal delay section 6 and third signal delay section 8 in FIG. 13 is greater than a desired value, detected is any of sole C, a combination of A and B and a combination of B and C. When detecting a combination of A and B or B and C, the latch section 204 outputs H. Thereafter, when C is detected singly, a second synchronism signal 203 is outputted. Meanwhile, the second synchronism signal 203 is supplied also to the reset input of the latch section 204 where it releases the hold operation of the latch section 204.

As apparent from the above explanation, where there is a deviation of delay time T occurring between the first signal delay section 4, the second signal delay section 6 and the third signal delay section 8, a first synchronism control signal 202 or second synchronism control signal 203 is obtained which represents a positive/negative of deviation. This is fed back to the first signal delay section 4, the second signal delay section 6 and the third signal delay section 8, thereby adjusting the delay time T. This makes it possible to make a correction to the delay time T.

According to this embodiment, because synchronism capture is feasible to a transmission-pulse interval T during reception operation, compensation is made for synchronism deviation due to temperature change or multi-path existence thereby improving reception sensitivity characteristic.

Incidentally, this embodiment explained the example that the synchronism detecting section 201 is applied to the UWB demodulating apparatus shown in FIG. 2. Similarly, the similar effect is available in case the synchronism detecting section 201 is applied similarly to the UWB demodulating apparatus of FIG. 8 in place of the UWB demodulating apparatus of FIG. 2.

The present invention is not limited to the embodiments 1 to 3 but can be implemented in various ways. For example, although the embodiments 1 to 3 exemplified the UWB demodulating apparatus, it is possible to configure the software for implementing a UWB demodulating method. For example, a program for executing a UWB demodulating method may be previously stored on a ROM (Read Only Memory) so the program can be operated by the CPU (Central Processing Unit). Meanwhile, a program for executing a UWB demodulating method may be stored on a computer-readable storage medium so that the program stored on the recording medium can be recorded to the RAM (Random Access Memory) to thereby operate the computer according to the program.

According to the UWB demodulating apparatus of the invention, by providing a PPM-modulation reception arrangement using a plurality of delayed detections, a UWB demodulating apparatus can be realized by a simple configuration without the need for a high-rate impulse generator mechanism requiring high consumption power during reception.

Meanwhile, according to the UWB demodulating apparatus of the invention, reception of bi-phase modulation is possible at the same time.

Also, reception sensitivity can be improved in the apparatus of the invention by relieving the jitter as a result of demodulation caused due to deviation in time between a plurality of delayed-detection results.

Meanwhile, reception sensitivity can be improved by correcting an error of delay time in delayed detection.

Furthermore, by employing a reception method utilizing delayed detection, it is possible to relieve the affection of an unwanted signal not correlated to UWB-modulation pulse interval. Accordingly, it is possible to enhance the resistance to interference with other radio communication sections.

What is claimed is:

1. A Ultra Wideband demodulating apparatus comprising:
    a first delayed-detecting section for outputting a first detection signal, according to a correlation between a reception signal PPM (pulse position modulation) at a pulse interval of T and a pulse variation width of τ and the reception signal delayed with a time (T+τ);
    a second delayed-detecting section for outputting a second detection signal, according to a correlation between the reception signal and the reception signal delayed with a time (T);
    a third delayed-detecting section for outputting a third detection signal, according to a correlation between the reception signal and the reception signal delayed with a time (T−τ);

a demodulating section for generating a demodulated signal by use of the first, second and third detection signals; and a synchronism detecting section for detecting an error of delay time T from the first, second and third detection signals, generating a correcting signal representative of a direction to correct the delay time T, and outputting the correcting signal to the first, second and third delayed-detecting sections, wherein the first, second and third delayed-detecting sections correct the delay time T by use of the correcting signal thereby restoring a synchronism.

2. A Ultra Wideband demodulating apparatus comprising:

a first delayed-detecting section for outputting a first detection signal, according to a correlation between a reception signal PPM (pulse position modulation) at a pulse interval of T and a pulse variation width of τ and the reception signal delayed with a time (T+τ);

a second delayed-detecting section for outputting a second detection signal, according to a correlation between the reception signal and the reception signal delayed with a time (T);

a third delayed-detecting section for outputting a third detection signal, according to a correlation between the reception signal and the reception signal delayed with a time (T−τ); and a demodulating section for generating a demodulated signal by use of the first, second and third detection signals, wherein the demodulating section comprises a latch section for recording a signal last arrived of the first and third detection signals, a positive-pulse generating section for generating a positive pulse signal when the first detection signal is detected and when the second detection signal is detected and the latch section has a record content of the first detection signal, a negative-pulse generating section for generating a negative pulse signal when the third detection signal is detected and when the second detection signal is detected and the latch section has a record content of the third detection signal, and a synthesizing section for adding the positive pulse signal and the negative pulse signal together.

3. A Ultra Wideband demodulating apparatus comprising:

a first delayed-detecting section for outputting a first detection signal, according to a correlation between a reception signal PPM (pulse position modulation) at a pulse interval of T and a pulse variation width of τ and the recention signal delayed with a time (T+τ);

a second delayed-detecting section for outputting a second detection signal, according to a correlation between the reception signal and the reception signal delayed with a time (T);

a third delayed-detecting section for outputting a third detection signal, according to a correlation between the reception signal and the reception signal delayed with a time (T−τ); and a demodulating section for generating a demodulated signal by use of the first, second and third detection signals, wherein the demodulating section comprises a latch section for recording a signal last arrived of the first and third detection signals, a positive-pulse generating section for generating a positive pulse signal when the first detection signal is detected and when the second detection signal is detected and the latch section has a record content of the first detection signal, a negative-pulse generating section for generating a negative pulse signal when the third detection signal is detected and when the second detection signal is detected and the latch section has a record content of the third detection signal, and a synthesizing section for adding the positive pulse with a signal the negative pulse is delayed a time τ.

4. A Ultra Wideband demodulating apparatus comprising:

a first mixing section for mixing a reception signal PPM (pulse position modulation) at a pulse interval T and a pulse variation width τ with the reception signal delayed with a time (T+τ), and generating a first mixed signal;

a first signal detecting section for generating a first detection signal when detecting a signal presence from an intensity of the first mixed signal;

a second mixing section for mixing the reception signal with the reception signal delayed with a time (T), and generating a second mixed signal;

a second signal detecting section for generating a second detection signal when detecting a signal presence from an intensity of the second mixed signal;

a third mixing section for mixing the reception signal with the reception signal delayed with a time (T−τ), and generating a third mixed signal;

a third signal detecting section for generating a third detection signal when detecting a signal presence from an intensity of the third mixed signal; and a demodulating section for detecting a PPM-modulation state from generation timing of the first, second and third detection signals, wherein the demodulating section comprises a latch section for recording a signal last arrived of the first and third detection signals, a positive-pulse generating section for generating a positive pulse signal when the first detection signal is detected and when the second detection signal is detected and the latch section has a record content of the first detection signal, a negative-pulse generating section for generating a negative pulse signal when the third detection signal is detected and when the second detection signal is detected and the latch section has a record content of the third detection signal, and a synthesizing section for adding the positive pulse signal and the negative pulse signal together.

5. A Ultra Wideband demodulating apparatus comprising:

a first mixing section for mixing a reception signal PPM (pulse position modulation) at a pulse interval T and a pulse variation width τ with the reception signal delayed with a time (T+τ), and generating a first mixed signal;

a first signal detecting section for generating a first detection signal when detecting a signal presence from an intensity of the first mixed signal;

a second mixing section for mixing the reception signal with the reception signal delayed with a time (T), and generating a second mixed signal;

a second signal detecting section for generating a second detection signal when detecting a signal presence from an intensity of the second mixed signal;

a third mixing section for mixing the reception signal with the reception signal delayed with a time (T−τ), and generating a third mixed signal;

a third signal detecting section for generating a third detection signal when detecting a signal presence from an intensity of the third mixed signal; and a demodulating section for detecting a PPM-modulation state from generation timing of the first, second and third detection signals, wherein the demodulating section comprises a latch section for recording a signal last arrived of the first and third detection signals, a positive-pulse generating section for generating a positive pulse signal when the first detection signal is detected and when the second detection signal is detected and the latch section has a record content of the first detection signal, a negative-pulse generating section for generating a negative pulse signal when the third detection signal is detected and when the second detection signal Is detected and the latch section has a record content of the third detection signal, and a synthesizing section for adding the positive pulse with a signal the negative pulse is delayed a time τ.

6. A Ultra Wideband demodulating apparatus comprising:
a first mixing section for mixing a reception signal PPM (pulse position modulation) at a pulse interval T and a pulse variation width τ with the reception signal delayed with a time (T+τ), and generating a first mixed signal;
a first signal detecting section for generating a first detection signal when detecting a signal presence from an intensity of the first mixed signal;
a second mixing section for mixing the reception signal with the reception signal delayed with a time (T), and generating a second mixed signal;
a second signal detecting section for generating a second detection signal when detecting a signal presence from an intensity of the second mixed signal;
a third mixing section for mixing the reception signal with the reception signal delayed with a time (T−τ), and generating a third mixed signal;
a third signal detecting section for generating a third detection signal when detecting a signal presence from an intensity of the third mixed signal;
a demodulating section for detecting a PPM-modulation state from generation timing of the first, second and third detection signals,
wherein the reception signal is a signal bi-phase-modulated in addition to PPM modulation, further comprising a first sign-detecting section for detecting a sign of the first detection signal and generating a first sign signal, a second sign-detecting section for detecting a sign of the second detection signal and generating a second sign signal, a third sign-detecting section for detecting a sign of the third detection signal and generating a third sign signal, and a second demodulating section for demodulating bi-phase modulation by use of the first, second and third sign signals,
wherein the second demodulating section comprises a signal detecting section for detecting a presence/absence of a signal by use of a signal intensity of the first to third sign signals, a positive-pulse generating section for generating a second positive pulse signal when a signal is detected in the signal detecting section, a negative-pulse generating section for detecting only a negative pulse in the first to third sign signal and generating a negative-pulse detection signal, an inverted-pulse generating section for holding a positive-or-negative binary sign and outputting an inverted pulse signal having an sign inverted from a sign being held when there is a negative pulse detecting signal, and a fourth mixing section for mixing the second positive pulse signal and the inverted pulse signal and obtaining a second demodulated signal.

7. A Ultra Wideband demodulating apparatus comprising:
a first mixing section for mixing a reception signal PPM (pulse position modulation) at a pulse interval T and a pulse variation width τ with the reception signal delayed with a time (T+τ), and generating a first mixed signal;
a first signal detecting section for generating a first detection signal when detecting a signal presence from an intensity of the first mixed signal;
a second mixing section for mixing the reception signal with the reception signal delayed with a time (T), and generating a second mixed signal;
a second signal detecting section for generating a second detection signal when detecting a signal presence from an intensity of the second mixed signal;
a third mixing section for mixing the reception signal with the reception signal delayed with a time (T−τ), and generating a third mixed signal;
a third signal detecting section for generating a third detection signal when detecting a signal presence from an intensity of the third mixed signal; and
a demodulating section for detecting a PPM-modulation state from generation timing of the first, second and third detection signals,
further comprising a synchronism detecting section for detecting an error of delay time T by use of the first, second and third detection signals and generating a correcting signal representative of a direction toward making a correction to the delay time T, thereby correcting the delay time T by use of the correcting signal when delaying the reception signal.

8. A UWB demodulating apparatus according to claim 7, wherein, provided that the first detection signal is A, the second detection signal is B and the third detection signal is C, then the synchronism detecting section generates a correcting signal for increasing the delay time T in the case A is singly detected after detecting a combination of A and B as well as a combination of B and C, and for decreasing the delay time T in the case C is singly detected after detecting a combination of A and B as well as a combination of B and C.

9. A Ultra Wideband demodulating apparatus comprising:
a first delayed-detecting section for outputting a first detection signal, according to a correlation between a reception signal PPM (pulse position modulation) at a pulse interval of T and a pulse variation width of τ and the reception signal delayed with a time (T+τ);
a second delayed-detecting section for outputting a second detection signal, according to a correlation between the reception signal and the reception signal delayed with a time (T−τ); and
a demodulating section for generating a demodulated signal by use of the first and second detection signals,
wherein the demodulating section outputs, as a demodulation result, a signal that is positive when one of the first and second detection signals is detected and negative when the other is detected.

10. A Ultra Wideband demodulating apparatus comprising:
a first delayed-detecting section for outputting a first detection signal, according to a correlation between a reception signal PPM (pulse position modulation) at a pulse interval of T and a pulse variation width of τ and the reception signal delayed with a time (T+τ);
a second delayed-detecting section for outputting a second detection signal, according to a correlation between the reception signal and the reception signal delayed with a time (T−τ); and a demodulating section for generating a demodulated signal by use of the first and second detection signals, wherein the demodulating section is configured by an SR-type flip-flop having a set input for the one of the first and second detection signals and a reset input for the other, to output data output thereof as a demodulation result.

11. A Ultra Wideband demodulating apparatus comprising:

a delayed-detection section for outputting a detection signal, according to a correlation between a reception signal PPM (pulse position modulation) at a pulse interval of T and a pulse variation width of τ and the reception signal delayed with a time (T); and a demodulating section for generating a demodulated signal by use of the detection signal, wherein the demodulating section holds an output state for a time T when the detection signal is inputted, and inverts an output signal at an interval of time T when the detection signal is not detected.

12. A Ultra Wideband demodulating apparatus comprising:

a delayed-detection section for outputting a detection signal, according to a correlation between a reception signal PPM (pulse position modulation) at a pulse interval of T and a pulse variation width of τ and the reception signal delayed with a time (T); and a demodulating section for generating a demodulated signal by use of the detection signal, wherein the demodulating section comprises a clock section having a reset input with the detection signal and outputting a clock signal at an interval of time T, an edge detecting section for detecting a sign change of the clock signal and outputting an edge detection signal, an exclusive OR section for outputting a sign-change signal according to an exclusive OR of the edge detection signal and the clock signal, and a D-type flip-flop having a clock input with the sign-change signal, a data input with a data inverted output to thereby output a data output as a demodulated signal.

* * * * *

UNITED STATES PATENT AND TRADEMARK OFFICE
CERTIFICATE OF CORRECTION

PATENT NO. : 7,366,235 B2  Page 1 of 1
APPLICATION NO. : 10/855691
DATED : April 29, 2008
INVENTOR(S) : Masahiro Mimura et al.

It is certified that error appears in the above-identified patent and that said Letters Patent is hereby corrected as shown below:

On the Title Page, please insert Item (30) entitled "Foreign Application Priority Data", and list the following references:

| May 28, 2003 | [JP] | Japan | 2003-150670 |
| May 19, 2004 | [JP] | Japan | 2004-148686 |

Signed and Sealed this

Nineteenth Day of August, 2008

JON W. DUDAS
*Director of the United States Patent and Trademark Office*